(No Model.) 3 Sheets—Sheet 1.

J. W. McKNIGHT.
COMPOSITION AND MOLD FOR THE MANUFACTURE OF ARTICLES FROM ARTIFICIAL SLATE.

No. 299,566. Patented June 3, 1884.

Witnesses:
T. C. Brecht
H. L. Ramey

Inventor:
John W. McKnight
By L. W. Ginsabaugh
Attorney (No Model.) 3 Sheets—Sheet 2.

J. W. McKNIGHT.
COMPOSITION AND MOLD FOR THE MANUFACTURE OF ARTICLES FROM ARTIFICIAL SLATE.

No. 299,566. Patented June 3, 1884.

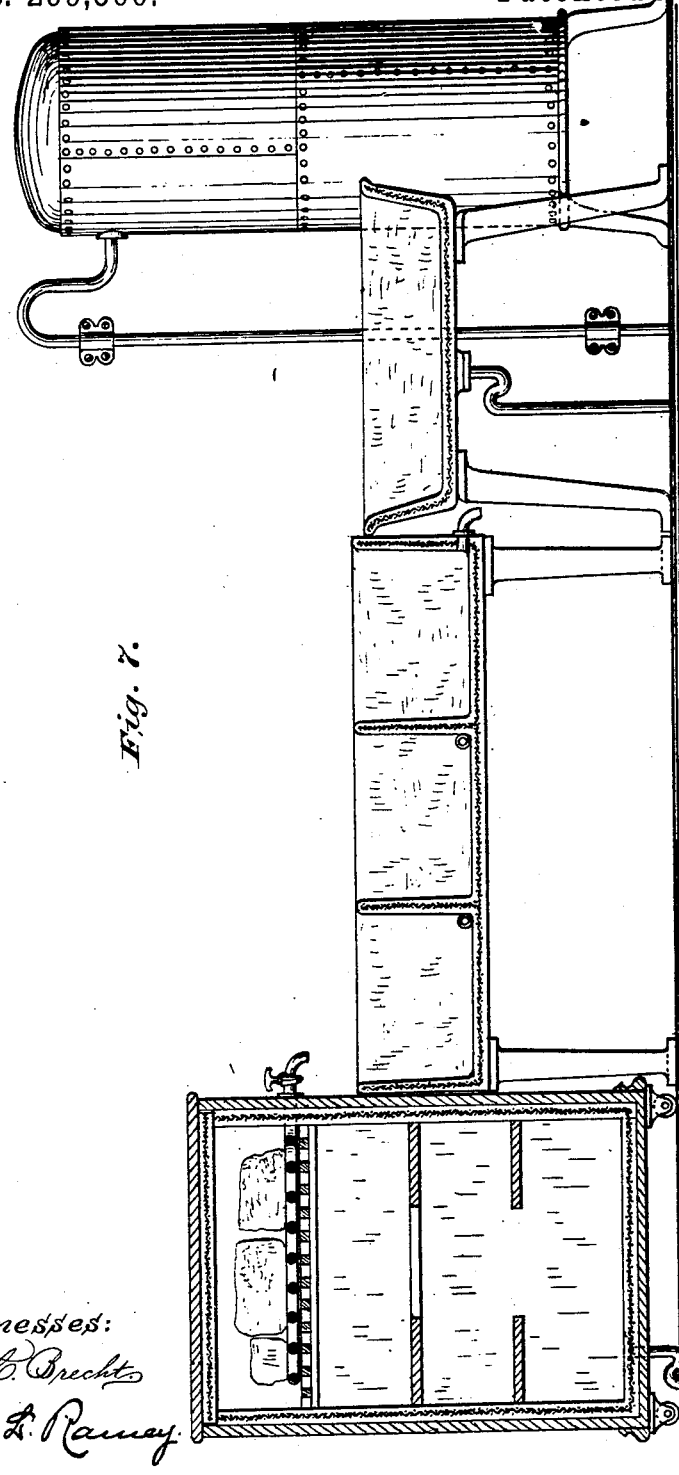
(No Model.) J. W. McKNIGHT. 3 Sheets—Sheet 3.
COMPOSITION AND MOLD FOR THE MANUFACTURE OF ARTICLES FROM ARTIFICIAL SLATE.
No. 299,566. Patented June 3, 1884.

UNITED STATES PATENT OFFICE.

JOHN WESTLEY McKNIGHT, OF WASHINGTON, DISTRICT OF COLUMBIA.

COMPOSITION AND MOLD FOR THE MANUFACTURE OF ARTICLES FROM ARTIFICIAL SLATE.

SPECIFICATION forming part of Letters Patent No. 299,566, dated June 3, 1884.

Application filed November 7, 1883. (No model.)

*To all whom it may concern:*

Be it known that I, J. W. McKNIGHT, a citizen of the United States, residing at Washington city, in the District of Columbia, have invented certain new and useful Improvements in Composition and Molds for the Manufacture of Articles from Artificial Slate, of which the following is a specification, reference being had therein to the accompanying drawings.

My invention relates to molds for the manufacture of articles from artificial slate or stone, and to a composition of matter from which the artificial slate is made.

Figure 1:
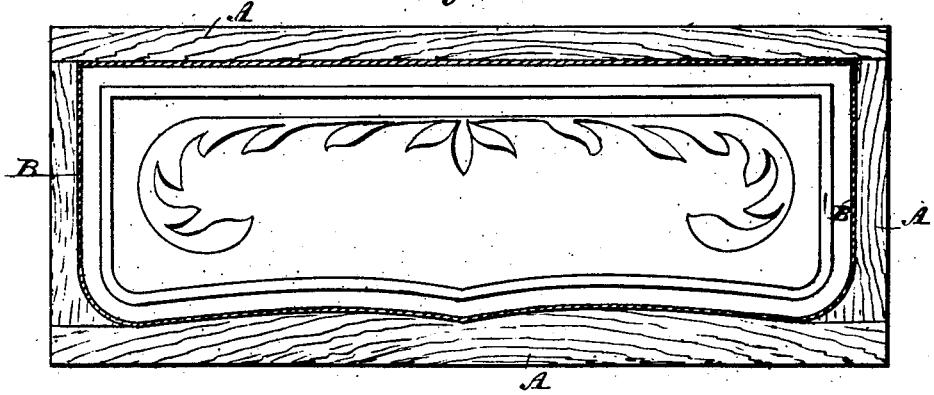
Figure 2:
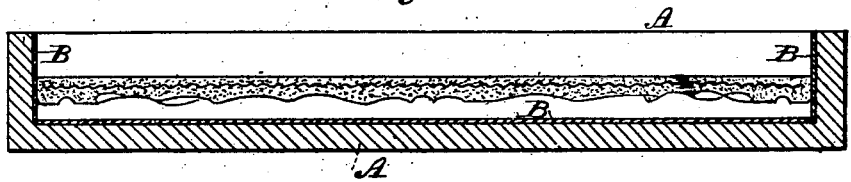
Figure 3:
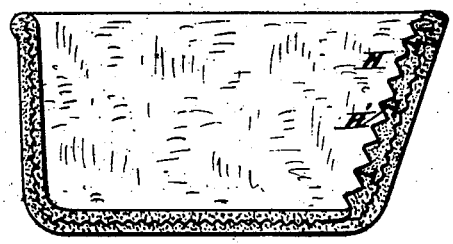
Figure 4:
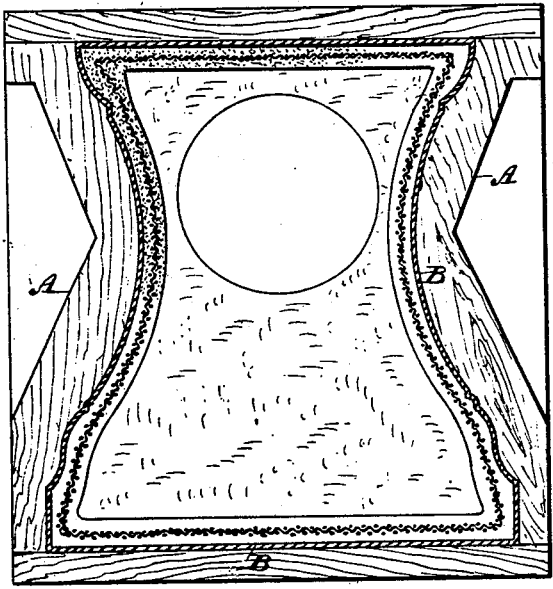
Figure 5:
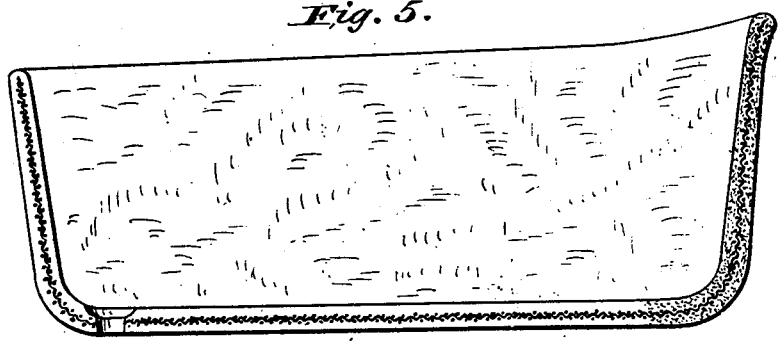
Figure 6:
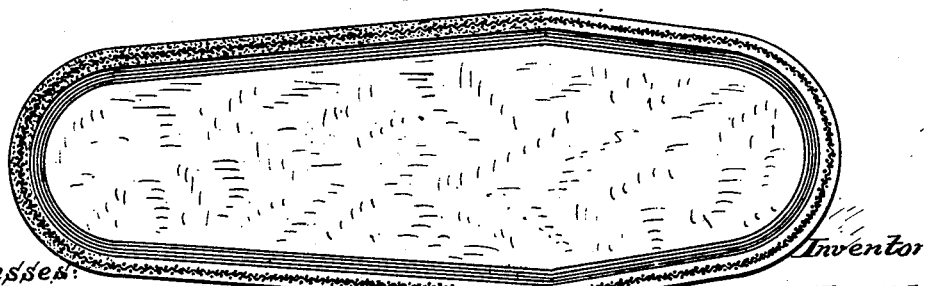

Referring to the drawings, Figure 1 is a top view of a mold with the ornamental plate therein. Fig. 2 is a sectional view of Fig. 1. Fig. 3 is a sectional view of a wash-tub having a metal rubbing-surface secured to its inner side. Fig. 4 is a sectional view of a clock-case in the mold. Figs. 5 and 6 are sectional views of a bath-tub and coffin, respectively. Fig. 7 is a sectional view of the arrangement of refrigerator, wash-tub, and sink as arranged in kitchen.

Great difficulty has been heretofore experienced by persons engaged in the manufacture of articles from quick-setting cement, by the molds (which are usually made of wood) becoming saturated, warped, and distorted by the absorption of water from the plastic or semi-plastic composition deposited in them to form the articles, so that in order to carry on a large business in this industry a considerable amount of money is necessarily tied up in molds. Where metal molds are used the action of the moisture together with the chemicals used in the composition tend to rust or corrode the same and make them unfit for use. I overcome these difficulties by lining the inside portions of the molds with suitable material which will not only protect the main portions of the mold from the destructive effects of water and acids, but will keep the inside of the molds true and smooth at all times, and the molds can be used continuously, and as soon as one article has been formed the molds can be filled again and again without having to keep a large stock of molds on hand.

In the drawings, A indicates the main body of the mold, which may be made of wood, iron, or any suitable material, and of the desired form to produce the article required. The molds are provided with a lining, B, of natural slate, thin slabs of natural stone or marble, glass, or non-corrosive metal, such as granitized sheet metal.

The material above mentioned is specially adapted for the lining of molds made of wood, and such lining may be secured to the inner surfaces of the molds by screws, or in any suitable manner. This material may also be used for the lining of metal molds, if desired; but I prefer to line the metal molds with a vitrifiable substance which fuses below the melting-point of iron, and such as is used in the manufacture of granitized sheet metal, as is well known in the market.

It is often desirable to produce designs in relief or in depression on articles made of artificial slate, stone, or marble, and where such are to be produced in relief, I cut into the bottom or sides of the mold the desired design, so that when the articles are molded therein the designs or ornaments will be produced in relief on the article. If, on the other hand, the design is to be produced in depression, I place within or attach to the mold the desired design, which may be struck up from sheet iron, brass, lead, or other suitable material, and then pour the plastic or semi-plastic composition over the same, and fill the molds to the desired height to form the articles. This will produce in depression the required design or ornamentation. Where entablatures or inscriptions are to be produced, I prefer to strike them up from sheet metal, either in relief or in depression, as is preferred, then coat such sheet metal with the vitrifiable composition, bake it to the required degree, and place the same in the bottom or side of the mold. This will be found to be very effective, and will produce the best of results.

I will now proceed to describe the ingredients I use in the manufacture of my artificial slate, and the proportions in which I prefer to use them. The proportions may, however, be varied within certain limits without departing from the spirit of my invention. To one barrel of Portland or other suitable cement, take one pound oxide of iron, three pounds metallic red, one pound drop-black, two pounds lamp-black, one pound Venetian red or other mineral color, six pounds pulverized alum mixed dry with the cement, and one gallon soluble glass in thirteen and one-half gallons of water. The above-mentioned ingredients are all thoroughly mixed and reduced to a plastic or semi-plastic condition by the incorporation therewith of a sufficient quantity of the solution of iron-rust in vinegar, one gallon of the solution to one barrel of water. The articles are then cast into the desired form in the molds of the character heretofore described, and when thoroughly set are removed from the molds and allowed to dry. The articles are then finished with a coat of boiled linseed-oil or glycerine well rubbed in with French putty-powder or finely-ground litharge suitably colored.

I will now proceed to describe some of the articles which I propose to make from artificial slate, although I do not limit myself to such articles.

In Fig. 4 I have shown a clock-case made in imitation of slate and cast in a mold of the character described, and strengthend by a network of wire-gauze embedded in the cement.

Figs. 5 and 6 illustrate a bath-tub and coffin, respectively, made of the same material and treated in the manner described, and having a net-work of wire embedded therein.

In Fig 7 I have shown a convenient arrangement of articles intended for kitchen-use, in which a refrigerator, wash-tubs, and sink are placed in juxtaposition. These articles may be made at the factory and sold as articles of trade from the stores. I may also construct them in the kitchen or other portions of the house where they are intended to be used by casting the same in position where they are intended to be used, thus avoiding the expense and liability to breakage incident to moving such heavy articles.

In Fig. 3 I show a wash-tub or tank in which the washing or rubbing surface is made of a sheet of corrugated zinc. The piece of corrugated zinc is bent at the ends and placed in the molds in the proper position. The cement is then poured in and allowed to set, thus embedding the ends of the zinc-plate in the artificial slate and producing an article for laundry-uses possessing valuable qualities.

Instead of embedding the edges of the metal plates in the plastic compound, I may secure to the back part of such plates, headed pins, or lugs, which when embedded in the composition will hold the corrugated plate or plates firmly in position.

The corrugated metal plate is indicated at H, and the lugs for holding the same to the body of the article at H'. Both forms of fastening—i. e., the embedded edges and the headed pins—are shown.

Having thus described my invention, what I claim and desire to secure by Letters Patent, is—

1. A mold for the manufacture of articles of artificial slate, stone, or marble, having a facing of vitreous or vitrifiable material fused thereon, as set forth.

2. A composition for artifical slate, consisting of cement, oxide of iron, metallic red, drop-black, lamp-black, Venetian red, soluble glass, pulverized alum, and solution of iron-rust and vinegar, in substantially the proportions set forth.

3. The method herein described of finishing artificial slate, which consists in coating the same with boiled linseed-oil or glycerine, and rubbing the same thoroughly into the article with French putty-powder or finely-ground litharge, suitably colored, as set forth.

4. As a new article of manufacture, a wash-tub having a washing-surface of a sheet of corrugated zinc, the edges of which are embedded in the artificial slate of which the body of the tub is composed, as set forth.

5. A wash-tub composed of artificial slate, artificial stone, or artificial marble, having a washing or rubbing surface of corrugated sheet-zinc or other suitable metal, the edges of which are embedded or otherwise secured to the sloping inner surface of said tub, as set forth.

In testimony whereof I affix my signature in presence of two witnesses.

JOHN WESTLEY McKNIGHT.

Witnesses:
C. S. DRURY,
CLARENCE L. ALEXANDER.